(12) United States Patent
Oki et al.

(10) Patent No.: US 7,367,718 B2
(45) Date of Patent: May 6, 2008

(54) OPTICAL MODULE

(75) Inventors: Kazushige Oki, Yokohama (JP); Toshio Mizue, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 878 days.

(21) Appl. No.: 10/655,612

(22) Filed: Sep. 5, 2003

(65) Prior Publication Data

US 2004/0207991 A1    Oct. 21, 2004

(30) Foreign Application Priority Data

Sep. 6, 2002   (JP) .......................... P2002-261766
Sep. 6, 2002   (JP) .......................... P2002-261770

(51) Int. Cl.
*G02B 6/36* (2006.01)

(52) U.S. Cl. ...................................... 385/92
(58) Field of Classification Search ................ 385/92
See application file for complete search history.

(56) References Cited

U.S. PATENT DOCUMENTS

| 6,213,651 | B1 * | 4/2001 | Jiang et al. ................... 385/92 |
| 6,287,128 | B1 | 9/2001 | Jones et al. |
| 6,335,869 | B1 | 1/2002 | Branch et al. |
| 6,445,475 | B1 | 9/2002 | Okubora et al. |
| 6,600,611 | B2 | 7/2003 | Inujima et al. |
| 6,659,655 | B2 * | 12/2003 | Dair et al. ..................... 385/92 |
| 6,760,497 | B1 * | 7/2004 | Straub ......................... 385/14 |
| 6,830,383 | B2 | 12/2004 | Huang |
| 6,893,168 | B2 | 5/2005 | Huang et al. |
| 6,916,122 | B2 * | 7/2005 | Branch et al. ................. 385/92 |
| 7,056,032 | B2 * | 6/2006 | Cheng et al. .................. 385/88 |
| 2002/0076173 | A1 * | 6/2002 | Jiang et al. ................... 385/92 |
| 2002/0110338 | A1 * | 8/2002 | Dair et al. ..................... 385/92 |

(Continued)

FOREIGN PATENT DOCUMENTS

JP    61-149129    9/1986

(Continued)

OTHER PUBLICATIONS

Office action issued in U.S. Appl. No. 10/655,589 on Feb. 7, 2006.

(Continued)

*Primary Examiner*—Michelle Connelly-Cushwa
*Assistant Examiner*—Kajli Prince
(74) *Attorney, Agent, or Firm*—McDermott Will & Emery LLP

(57) ABSTRACT

The present invention provides an optical module with an improved temperature condition surrounding an opto-electronic device. The optical module of the present invention comprises an optical sub-assembly including an opto-electronic device, a first circuit board electrically connected to the optical sub-assembly, an electronic device mounted on the first circuit board, a lower housing for mounting the first circuit board, an upper housing for covering the circuit board and electronic device, and a metal cover for covering the upper housing. Constructed in the optical module are a first heat-dissipating path for dissipating heat from the electronic device to the cover via the upper housing, and a second heat-dissipating path, different from the first heat-dissipating path, for dissipating heat from the optical sub-assembly to the cover by way of the upper housing.

11 Claims, 11 Drawing Sheets

U.S. PATENT DOCUMENTS

| | | |
|---|---|---|
| 2002/0154362 A1 | 10/2002 | Oki et al. |
| 2003/0063424 A1 | 4/2003 | Inujima et al. |

FOREIGN PATENT DOCUMENTS

| | | |
|---|---|---|
| JP | 2-17862 | 2/1990 |
| JP | 3-167506 | 7/1991 |
| JP | 3-167508 | 7/1991 |
| JP | 5-291693 | 11/1993 |
| JP | 8-136766 | 5/1996 |
| JP | 2001-091795 | 4/2001 |
| JP | 2001-229660 A | 8/2001 |
| JP | 2001-296457 | 10/2001 |
| JP | 2002-15450 | 1/2002 |
| JP | 2002-98597 | 4/2002 |
| JP | 2002-102293 | 4/2002 |
| WO | WO 00/77551 A1 | 12/2000 |

OTHER PUBLICATIONS

Office Action dated Jul. 4, 2006.

Japanese Office Action issued in corresponding Japanese Patent Application No. JP 2002-262006, dated Dec. 12, 2006.

SFF Committee, INF-8074i Specification for SFP (Small Formfactor Pluggable) Transceiver. Rev 1.0, May 12, 2001.

Japanese Office Action issued in Japanese Patent Application No. JP 2003-314658, mailed Dec. 11, 2007.

Japanese Office Action, issued in corresponding Japanese Patent Application No. 2003-315658, dated on Jul. 27, 2007.

Tobita, K, et al. "2.125 Gbps SFP Short Wavelength Optical Transciever", Technical Report of IEICE vol. 101, No. 283, The Institute of Electronics, Information and Communication Engineers. Aug. 31, 2001, pp. 25-30.

* cited by examiner

OPTICAL MODULE

BACKGROUND OF THE INVENTION

1. Field of the Invention

The present invention relates to a hot-swapping optical module.

2. Related Background Art

Optical modules are widely used in optical communication systems such as optical LAN, and the like. A conventional example of optical modules comprises a housing having a bottom face provided with a substrate. Mounted on the substrate are a transmitting optical sub-assembly, a receiving optical sub-assembly, electronic components, and the like. The electronic components include a driver device for driving a light-emitting device (see, for example, U.S. Pat. No. 6,335,869 B1).

Meanwhile, the light-emitting device included in the transmitting optical sub-assembly is to be affected by heat, which makes it necessary for the surroundings of the light-emitting device to minimize their temperature rise in order to improve the reliability and performances of the optical module.

SUMMARY OF THE INVENTION

In the optical module disclosed in the reference mentioned above, however, the transmitting optical sub-assembly and the substrate are connected to each other with a lead, so that the heat transmits from the substrate to the transmitting optical sub-assembly via the lead, thereby raising the temperature in the surroundings of the light-emitting device.

Therefore, it is an object of the present invention to provide an optical module which improves the temperature condition in the surroundings of an opto-electronic device such as light-emitting device.

The optical module in accordance with one aspect of the present invention comprises an optical sub-assembly including an opto-electronic device, a first circuit board electrically connected to the optical sub-assembly, an electronic device mounted on the first circuit board, a lower housing for mounting the first circuit board, an upper housing disposed so as to cover the first circuit board and electronic device, and a metal cover for covering the upper housing; the optical module including a first heat-dissipating path for dissipating heat from the electronic device to the cover by way of the upper housing, and a second heat-dissipating path, different from the first heat-dissipating path, for dissipating heat from the optical sub-assembly to the cover by way of the upper housing.

The optical module in accordance with the aspect of the present invention can dissipate heat from the electronic device mounted on the circuit board via the first heat-dissipating path, thereby reducing the heat transmitted from the circuit board to the optical sub-assembly. On the other hand, the second heat-dissipating path can dissipate the heat from the optical sub-assembly. Therefore, the temperature condition in the surroundings of the opto-electronic device can be improved.

Preferably, the optical module in accordance with the aspect of the present invention further comprises respective thermal sheet disposed between the electronic device and the upper housing and between the optical sub-assembly and the upper housing. The thermal sheet can improve the adhesion between the optical sub-assembly and the upper housing and between the electronic device and the upper housing. Therefore, the heat from the electronic device and optical sub-assembly can be dissipated more efficiently.

Preferably, in the optical module in accordance with the aspect of the present invention, the cover includes an elastic portion toward the outside of the optical module; and, when the optical module is inserted into a cage provided on a host board, the elastic portion and an inner face of the cage come into contact with each other so as to secure a heat-dissipating path for the cage.

In such a configuration, the heat from the electronic device and optical sub-assembly transmitted to the cover is dissipated to the cage via the elastic portion provided in the cover. As a consequence, the temperature condition of the optical module is further improved.

Preferably, in the optical module in accordance with the aspect of the present invention, the first circuit board is held between the upper and lower housings, the lower housing being provided with a mount for mounting the first circuit board, a first electronic device being mounted on a main surface of the first circuit board, a rear face of the first circuit board opposite to the main surface being mounted with a second electronic device, the upper housing being provided with a first space for providing the first electronic device, the lower housing being provided with a second space for providing the second electronic device. In such a configuration, an electronic component mounted on the main surface of the first circuit board can be mounted in the first space, whereas another electronic component mounted on the rear face of the first circuit board can be provided in the second space, whereby the first circuit board can be provided between the upper and lower housings compactly.

Preferably, the optical module in accordance with the aspect of the present invention further comprises a second circuit board and a connecting substrate for connecting the first and second circuit boards to each other, a third electronic device being mounted on a main surface of the second circuit board, the upper housing being provided with a third space opposing the first space, the second circuit board being mounted with the upper housing such that the third electronic device is provided in the third space.

In such a configuration, the third electronic device mounted on the main surface of the second circuit board is provided in the third space, whereby the second circuit board can also be provided compactly. Since the upper housing is disposed between the first and second circuit boards, heat is restrained from staying between the first and second circuit boards.

Preferably, in the optical module in accordance with the aspect of the present invention, heat from the second electronic device mounted on the rear face of the first circuit board is emitted toward the lower housing, whereas heat from the third electronic device mounted on the main surface of the second circuit board is emitted toward the upper housing.

In the optical module in accordance with the aspect of the present invention, the optical sub-assembly may be a transmitting optical sub-assembly including a semiconductor light-emitting device as the opto-electronic device, whereas the electronic device may be a driver IC for driving the transmitting optical sub-assembly.

In the optical module in accordance with the aspect of the present invention, the upper housing may be made of aluminum die cast or aluminum. The lower housing may also be made of aluminum die cast or aluminum.

The optical module in accordance with another aspect of the present invention comprises an optical sub-assembly including an opto-electronic device, a fin thermally coupled to the optical sub-assembly, a circuit board electrically connected to the optical sub-assembly, an electronic device mounted on the circuit board, a lower housing for mounting the circuit board, an upper housing for covering the circuit board and electronic device, and a metal cover for covering the upper housing; the optical module including a first heat-dissipating path for dissipating heat from the electronic device to the cover via the upper housing, and a second heat-dissipating path, different from the first heat-dissipating path, for dissipating heat from the optical sub-assembly via the fin.

The optical module in accordance with the aspect of the present invention can dissipate the heat from the electronic device mounted on the circuit board via the first heat-dissipating path, thereby reducing the heat transmitted from the circuit board to the optical sub-assembly. On the other hand, the second heat-dissipating path including the fin can dissipate the heat from the optical sub-assembly. Therefore, the temperature condition in the surroundings of the opto-electronic device can be improved.

Preferably, the optical module in accordance with the aspect of the present invention further comprises respective thermal sheet disposed between the electronic device and the upper housing and between the fin and the optical sub-assembly. The thermal sheet can improve the adhesion between the electronic device assembly and the upper housing and between the fin and the optical sub-assembly. Therefore, the heat from the electronic device and optical sub-assembly can be dissipated more efficiently.

Preferably, in the optical module in accordance with the aspect of the present invention, the fin has a leading end provided with a projection raised toward the outside of the optical module; and, when the optical module is inserted into a cage provided on a host board, the projection of the fin and an inner face of the cage come into contact with each other so as to secure the second heat-dissipating path for the cage. In such a configuration, the heat generated by the optical sub-assembly is dissipated to the cage via the fin.

DESCRIPTION OF THE PREFERRED EMBODIMENTS

Embodiments of the present invention will be explained with reference to the accompanying drawings. When possible, constituents identical to each other will be referred to with numerals identical to each other without overlapping explanations.

First Embodiment

Figure 1:
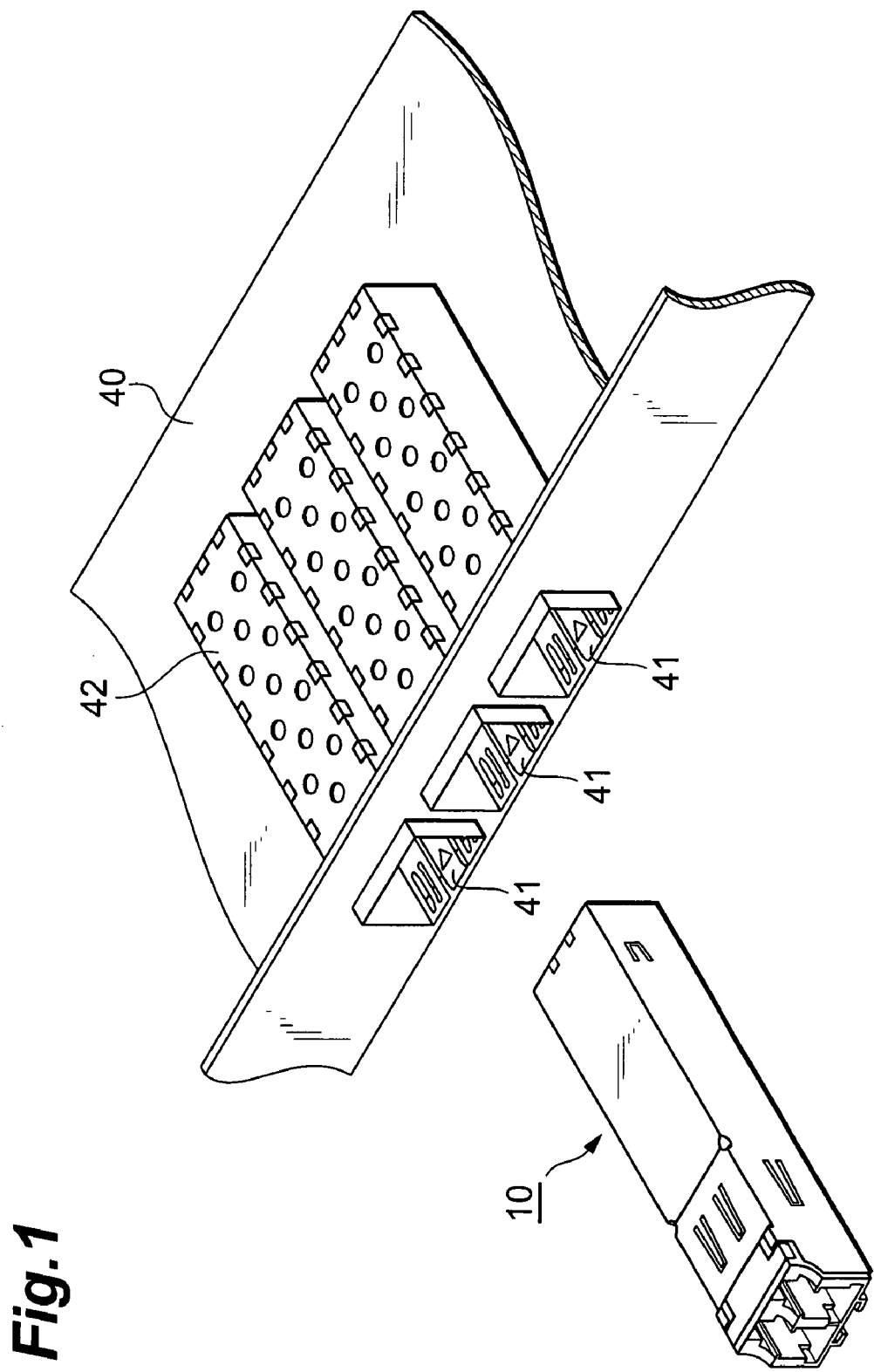
FIG. 1 is a view showing the optical module in accordance with a first embodiment of the present invention and a host board.

FIG. 1 is a perspective view showing the optical module 10 in accordance with a first embodiment, and a host board 40 into which the optical module 10 is fitted. In this specification, words "upper" and "lower" among those indicating directions will be used with reference to the state where the optical module 1 is mounted on the host board 40, i.e., the state shown in FIG. 1.

As shown in FIG. 1, the optical module 10 is inserted into a cage 42 provided on the host board 40.

Figure 2:
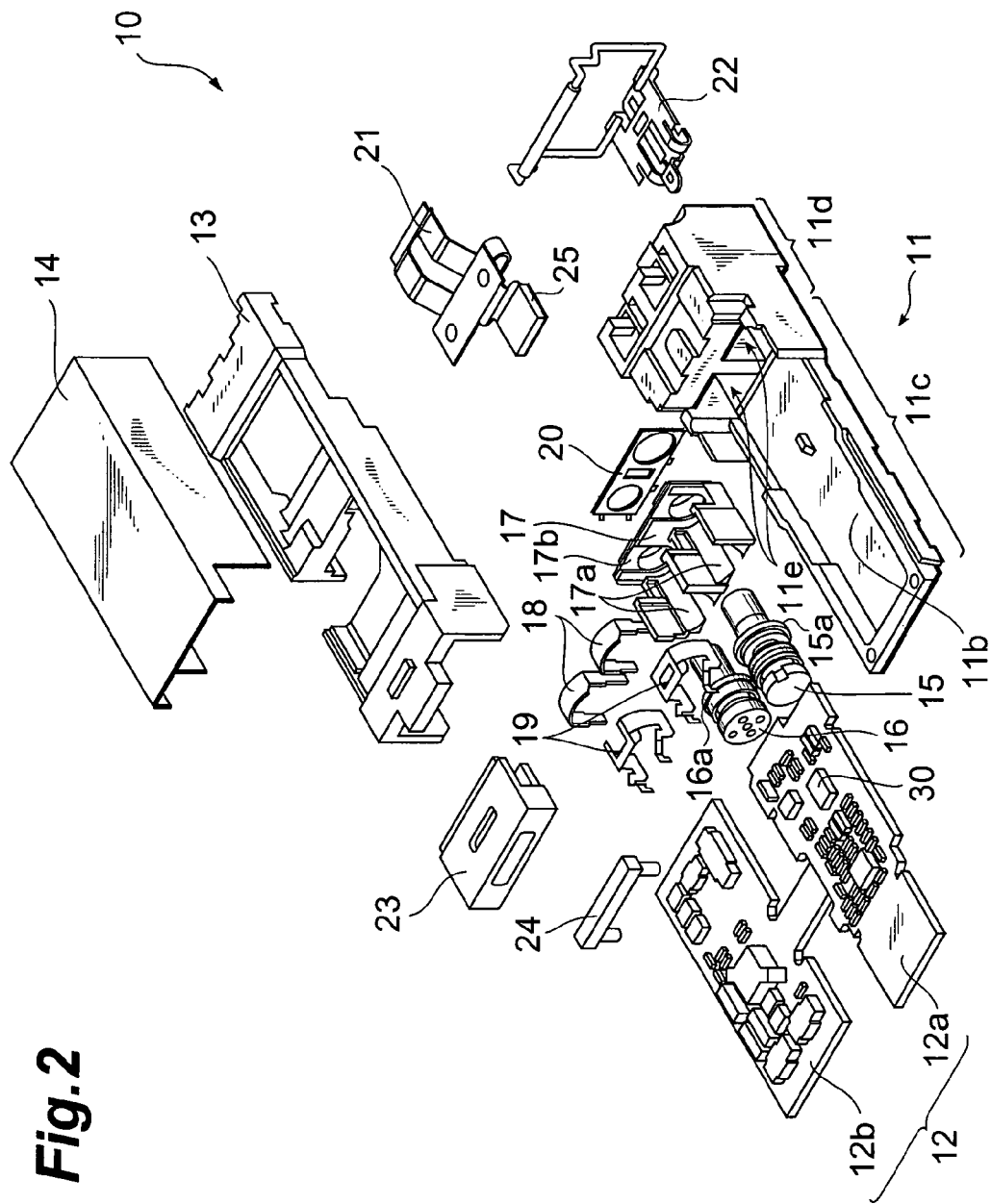
FIG. 2 is an exploded perspective view showing the optical module in accordance with the first embodiment of the present invention.

FIG. 2 is an exploded perspective view of the optical module 10. The optical module 10 includes a lower housing 11, a circuit board 12, an upper housing 13, a cover 14, a transmitting optical sub-assembly 15, a receiving optical sub-assembly 16, a block 17, holders 18, brackets 19, a shield 20, a fin 21, an actuator 22, a cap 23, and a substrate stopper 24.

The lower housing 11 mounts the transmitting optical sub-assembly 15 thereon, the receiving optical sub-assembly 16, and the circuit board 12. The lower housing 11 includes a mounting portion (second space) 11b for mounting the transmitting optical sub-assembly 15, the receiving optical sub-assembly 16, and a first substrate 12a of the circuit board 12. The lower housing 11 is formed by an alloy including zinc or aluminum as an ingredient or by aluminum.

The lower housing 11 comprises a main portion 11c including the mounting portion 11b, and a receptacle 11d provided at one end of the main portion 11c.

The receptacle 11d includes openings 11e for receiving respective end portions of the transmitting optical sub-assembly 15 and receiving optical sub-assembly 16 from one end. From the other end, the openings 11e can receive optical connectors (not depicted), whereby the transmitting optical sub-assembly 15 and receiving optical sub-assembly 16 can optically be coupled to optical fibers held by the optical connectors.

The first substrate 12a has both sides provided with electronic components. In this embodiment, a driver device 30 for driving a light-emitting device of the transmitting optical sub-assembly 15 is provided on the main surface of the first substrate 12a. The first substrate 12a is mounted such that its rear face opposes the mounting portion 11b of the lower housing 11.

The transmitting optical sub-assembly 15 and receiving optical sub-assembly 16 are attached to the first substrate 12a by way of the brackets 19 and lead pins (not depicted). The substrate stopper 24 secures the first substrate 12a longitudinally of the optical module 10.

The transmitting optical sub-assembly 15 and receiving optical sub-assembly 16 are placed on their corresponding holding portions 17a, each having a semicircular cross section, in the block 17 and are secured to the block 17 by the holders 18.

The transmitting optical sub-assembly 15 and receiving optical sub-assembly 16 include flanges 15a and 16a, respectively. The block 17 comprises a front wall 17b disposed at one end of the holding portions 17a. The front wall 17b has openings through which the respective end portions of the transmitting optical sub-assembly 15 and receiving optical sub-assembly 16 pass.

The end portions of the transmitting optical sub-assembly 15 and receiving optical sub-assembly 16 pass through the openings of the front wall 17b, whereas the flanges 15a and 16a are held between their corresponding holders 18 and the front wall 17b, whereby the transmitting optical sub-assembly 15 and receiving optical sub-assembly 16 are secured to the block 17.

Figure 3:
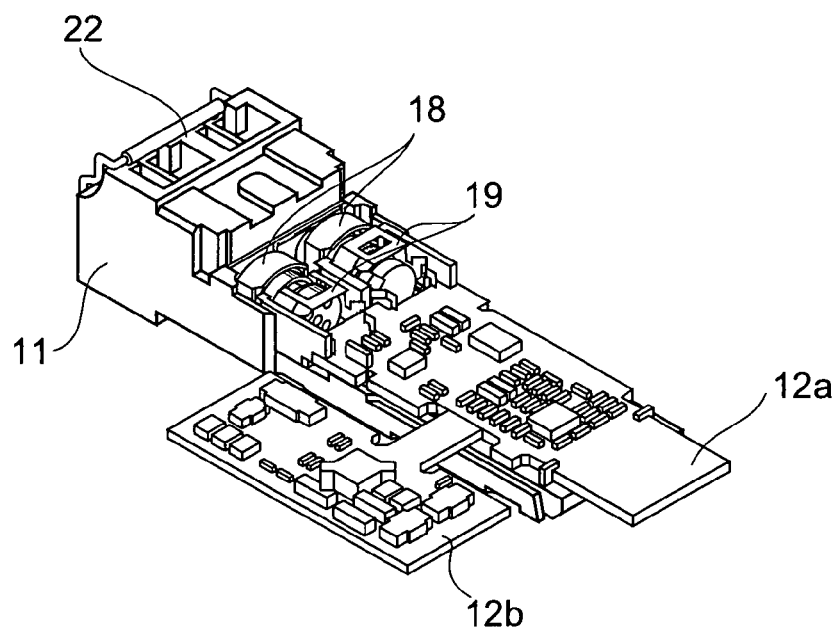
FIG. 3 is a perspective view showing a part of the optical module in accordance with the first embodiment of the present invention, illustrating a state where functional components such as a first substrate, a transmitting optical sub-assembly, and a receiving optical sub-assembly are mounted on a lower housing.

A shield 20 is held between the block 17 and the lower housing 11. FIG. 3 shows the arrangement where the first substrate 12a, transmitting optical sub-assembly 15, and receiving optical sub-assembly 16 are attached to the lower housing 11 as such.

In FIG. 3, the actuator 22 is attached to the lower housing 11 together with the first substrate 12a, transmitting optical sub-assembly 15, and receiving optical sub-assembly 16. The actuator 22 is a member which utilizes the principle of leverage so that a protrusion (unseen in FIG. 3) provided in the lower housing 11 are moved toward the lower housing 11 and removed from a hook 41 of the cage 42.

Figure 4:
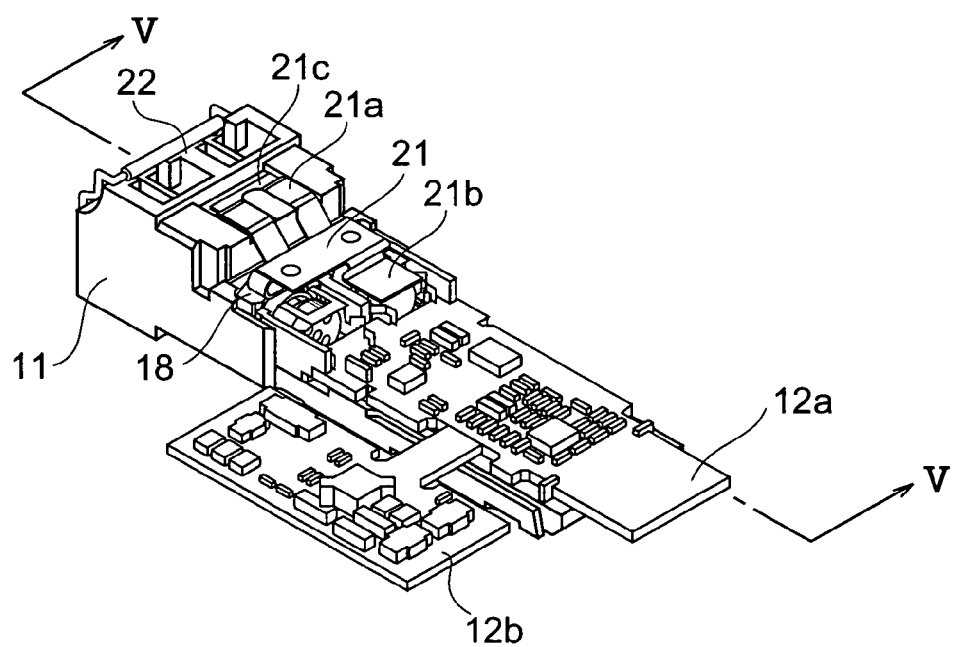
FIG. 4 is a perspective view showing a part of the optical module in accordance with the first embodiment of the present invention, illustrating a state where a fin is mounted.
Figure 5:
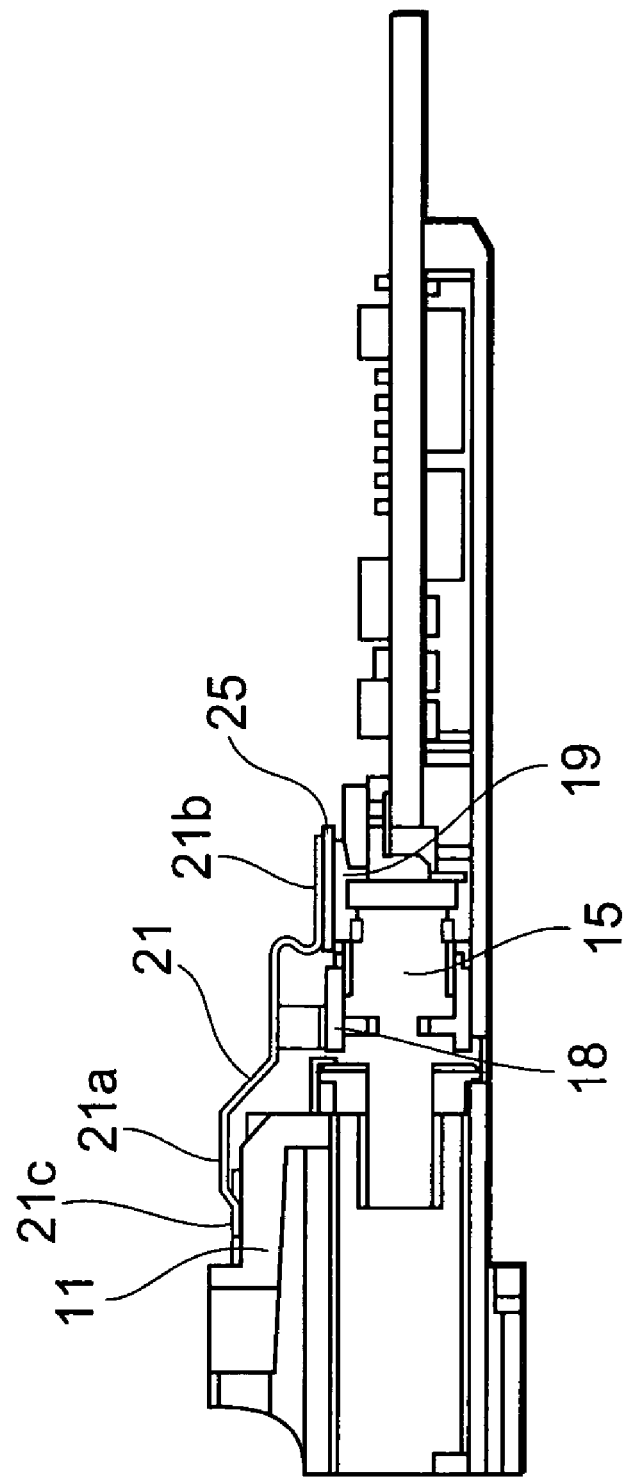
FIG. 5 is a sectional view taken along the line V-V of FIG. 4.

Further, the fin 21 is mounted to the transmitting optical sub-assembly 15 and receiving optical sub-assembly 16. FIG. 4 is a perspective view showing a part of the optical module 10, illustrating the configuration where the fin 21 is mounted. FIG. 5 is a longitudinal sectional view (taken along the line VI-VI) of FIG. 4. Mounted on the brackets 19 attached to the transmitting optical sub-assembly 15 and receiving optical sub-assembly 16 is a silicone sheet (thermal sheet) 25. One end 21b of the fin 21 is in contact with the transmitting optical sub-assembly 15 via the silicone sheet 25. The other end 21c of the fin 21 is in contact with the lower housing 11.

As a consequence, heat is transmitted from the receiving optical sub-assembly 15 and transmitting optical sub-assembly 16 to the lower housing 11 via the fin 21. For example, the heat generated by the receiving optical sub-assembly 16 is transferred to the fin 21 via the silicone sheet 25, so as to be transmitted to the lower housing 11. Further, the fin 21 is provided with a projection 21a, which comes into contact with the cage 42 when the optical module 10 is inserted into the cage 42. Therefore, the heat transferred to the fin 21 is efficiently transmitted to the cage 42 as well. As such, the fin 21 and the silicone sheet 25 constitute the "second heat-dissipating path" in the present invention. For enhancing thermal conductivity, the silicone sheet 25 may contain metal fillers. Each of the fin 21, brackets 19, and holders 18 is formed from an alloy containing copper as an ingredient.

The upper housing 13 is mounted on the lower housing 11. The upper housing 13 and lower housing 11 hold and secure the first substrate 12a and fin 21 therebetween.

Figure 6:
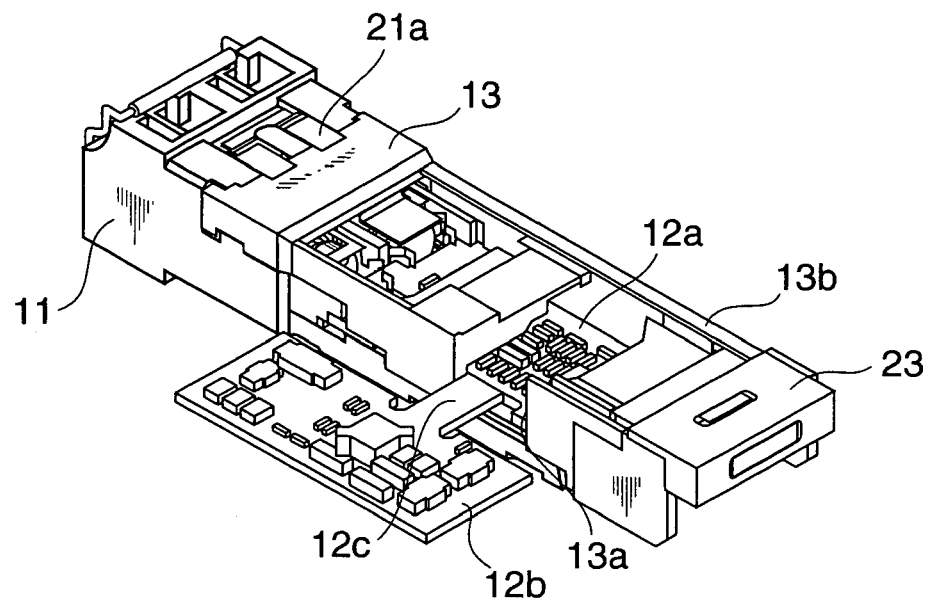
FIG. 6 is a perspective view showing a part of the optical module in accordance with the first embodiment of the present invention, illustrating a state where an upper housing is placed.

FIG. 6 is a perspective view of the optical module 10 mounted with the upper housing 13. The cap 23 is attached to an end portion of the upper housing 13. Details of how the first substrate 12a is secured to the upper housing 13 will be explained later. The upper housing 13 is formed by an alloy containing aluminum as an ingredient or by aluminum.

The upper face of the upper housing 13 is provided with a mounting portion (third space) 13b, whereas the second substrate 12b is mounted such that the surface provided with electronic components thereon is oriented to the upper housing 13. The first substrate 12a and the second substrate 12b are connected to each other by a flexible substrate 12c, whereas the electronic components provided on the first substrate 12a and second substrate 12b constitute an electronic circuit. The flexible substrate 12c is held in a cutout 13a formed at a side face of the upper housing 13.

Figure 7:
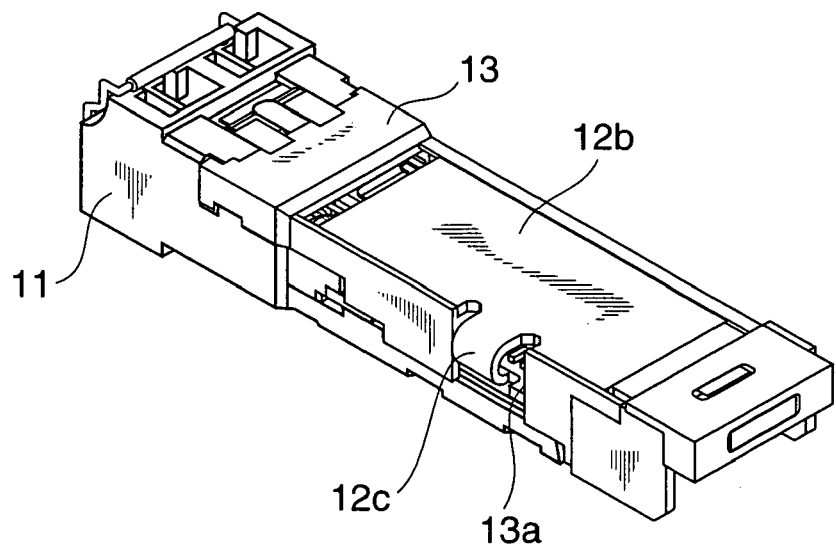
FIG. 7 is a perspective view showing a part of the optical module in accordance with the first embodiment of the present invention, illustrating a state where a second substrate is placed on the upper housing.

FIG. 7 shows the arrangement where the second substrate 12b is mounted on the upper housing 13. As shown in FIG. 7, the second substrate 12b is mounted such that the main surface provided with the electronic components thereon is oriented to the upper housing 13, whereby no electronic components are exposed. When the metal cover 14 is disposed in this arrangement so as to cover the second substrate 12b, the optical module 10 is completed.

Figure 8:
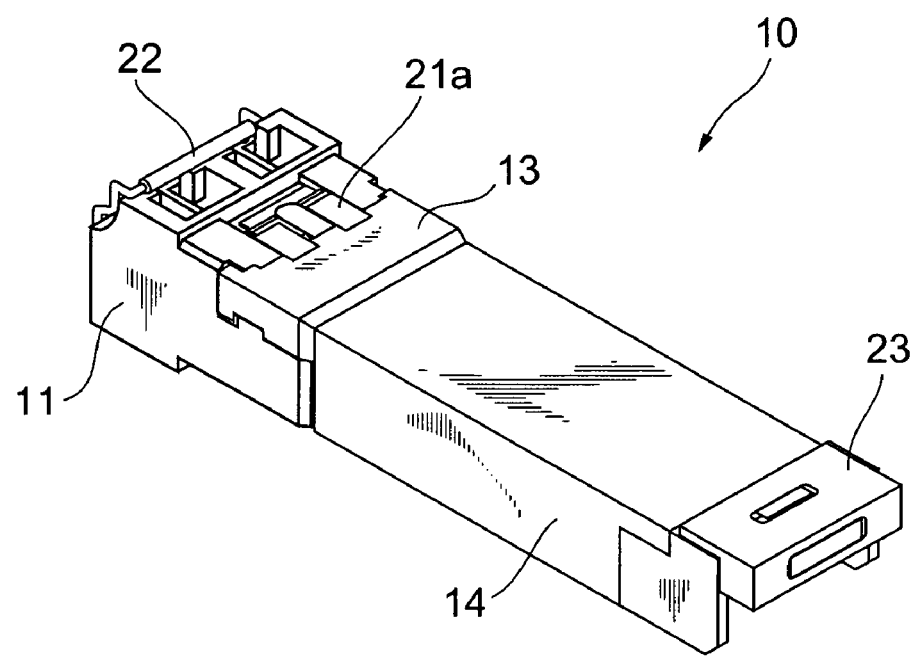
FIG. 8 is a perspective view showing the optical module in accordance with the first embodiment of the present invention.

FIG. 8 is a perspective view showing thus completed optical module 10. The cover 14 covers the second substrate 12b, whereby the second substrate 12b is held between the cover 14 and the upper housing 13. The cover 14 is constructed so as to cover a portion of the upper housing 13, whereby the remaining portion of the upper housing 13 is exposed. The exposed portion of the upper housing 13 constitutes a portion of the outer case of the optical module 10.

Figure 9:
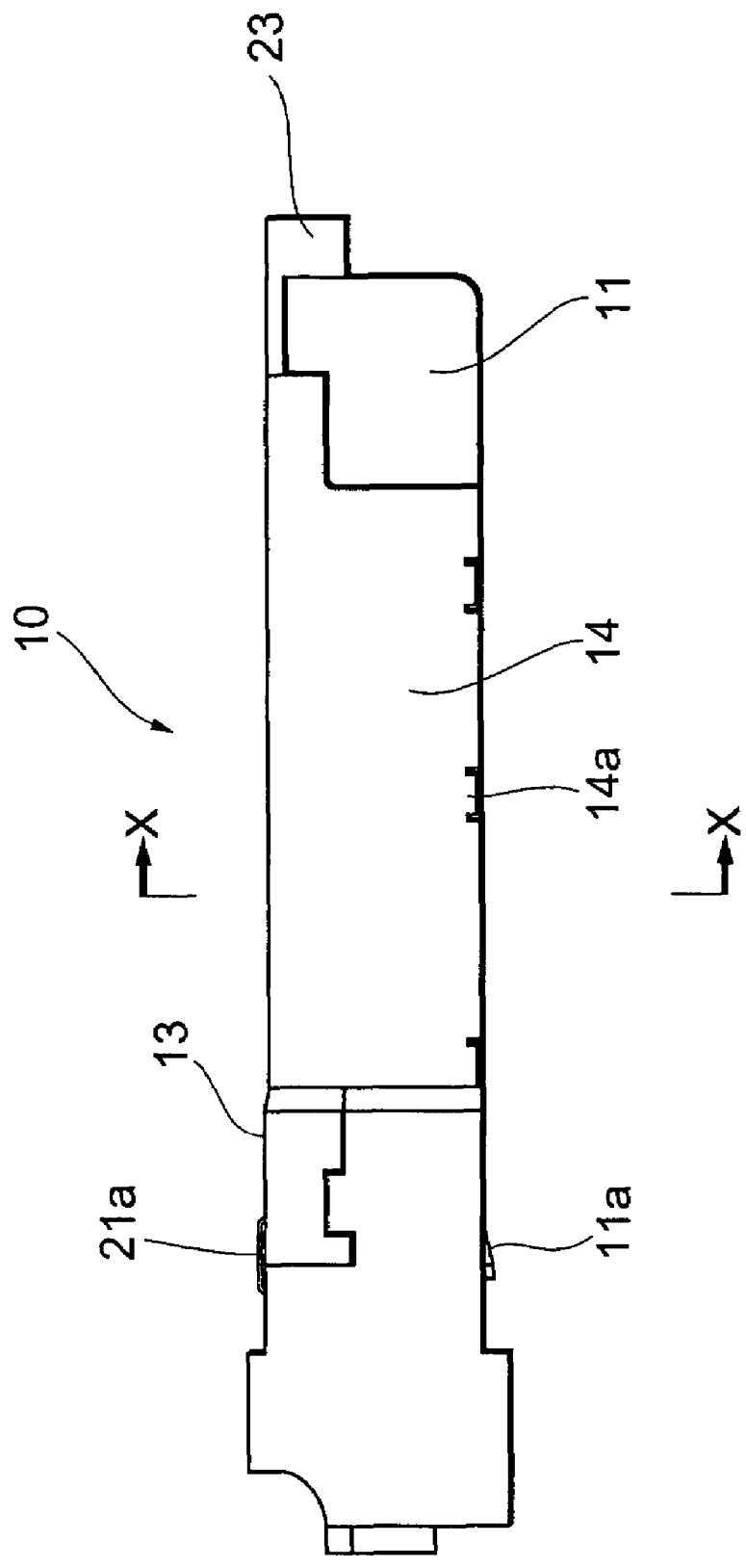
FIG. 9 is a side view of the optical module in accordance with the first embodiment of the present invention.

FIG. 9 is a side view of the optical module 10. The cover 14 is provided with lugs 14a, which engage predetermined portions of the lower housing 11, thereby securing the cover 14 and the lower housing 11 to each other. When the optical module 10 is fitted into the cage 42 provided on the host board 40 shown in FIG. 1, the projection 21a of the fin 21 comes into contact with the inside of the cage 42, thereby urging a protrusion 11a of the lower housing 11 toward the host board 40.

Figure 10:
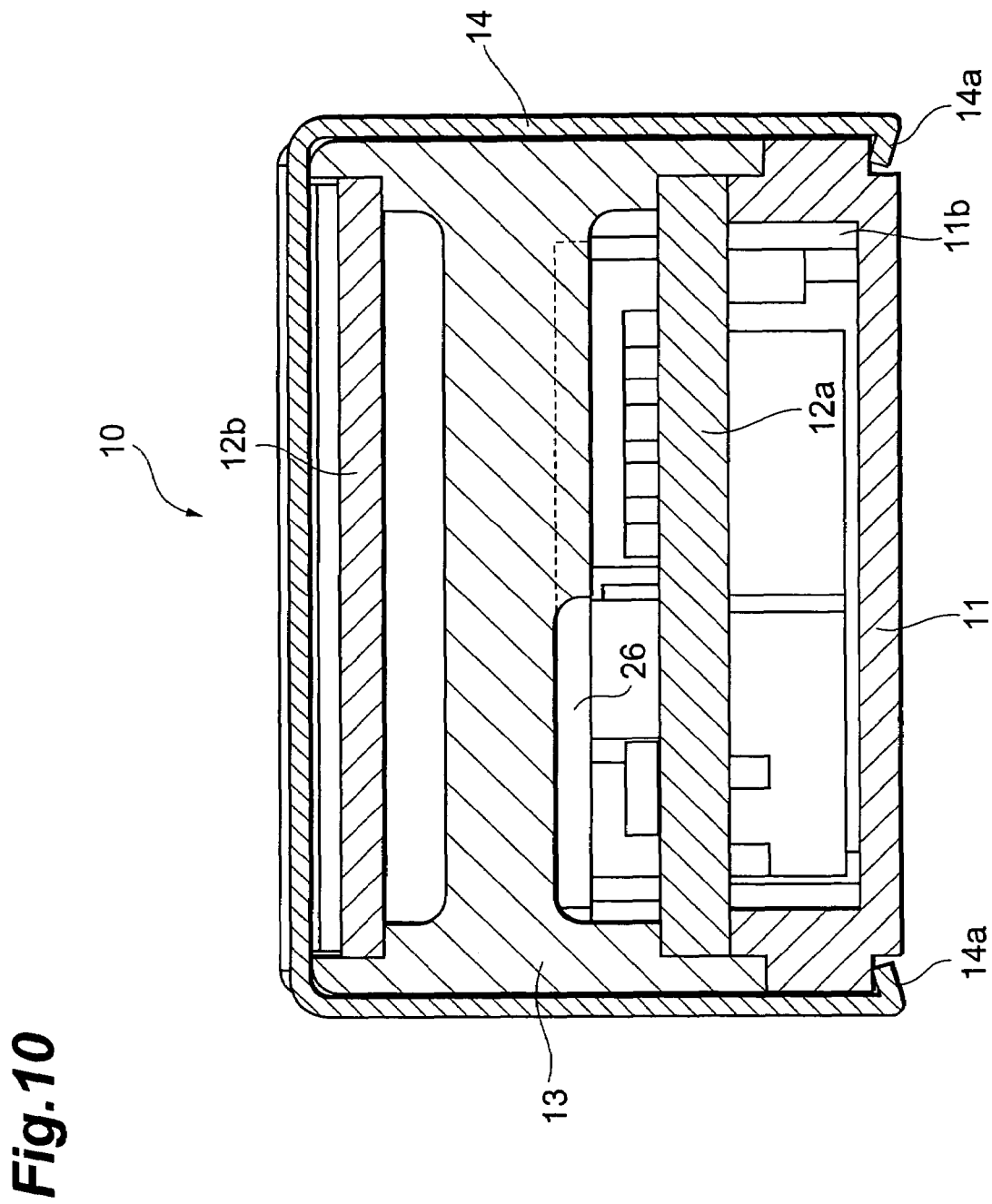
FIG. 10 is a sectional view taken along the line X-X of FIG. 9.

FIG. 10 is a sectional view taken along the line X-X of FIG. 9. As shown in FIG. 10, both sides of the first substrate 12a are provided with electronic components. When the first substrate 12a is disposed on the lower housing 11, the electronic components provided on the rear face are received in the mounting portion 11b of the lower housing 11. The first substrate 12a is held and secured between the lower housing 11 and the upper housing 13. The electronic components provided on the main surface of the first substrate 12a are received in the space of the upper housing 13. Among electronic components provided on the main surface of the first substrate 12a, those generating heat such as the driver device 30, for example, are in contact with a silicone sheet 26. The silicone sheet 26 is also in contact with the upper housing 13, thereby transmitting the heat generated by an electronic component such as the driver device 30 to the upper housing 13. Namely, the upper housing 13 and the silicone sheet 13 constitute the "first heat-dissipating path" of the present invention. For enhancing thermal conductivity, the silicone sheet 26 may contain metal fillers.

In the second substrate 12b, only the main surface facing the upper housing 13 is provided with electronic components. The heat generated by the electronic components provided on the second substrate 12b is mainly emitted toward the upper housing 13. The heat is transmitted to the upper housing 13, so as to be dissipated to the outside of the optical module 10.

Since the heat transferred from the first substrate 12a or second substrate 12b via lead pins (not depicted) of the transmitting optical sub-assembly 16 can be reduced, the surrounding temperature condition can be improved further.

Since the upper housing 13 is at least in contact with the driver device 30 via the silicone sheet 26, the heat generated by the driver device 30 is transferred to the upper housing 13 by way of the silicone sheet 26.

Since the main surface of the second substrate 12b provided with electronic components opposes the upper housing 13, the heat generated by the electronic components provided on the second substrate 12b is also transferred to the upper housing 13. This can suppress the heat from staying between the first substrate 12a and the second substrate 12b, thereby improving the temperature condition in the surroundings of the transmitting optical sub-assembly 15 including the light-emitting device.

The heat generated by the transmitting optical sub-assembly 15 is transferred via the fin 21, and thus can efficiently be transmitted to the outside of the optical module 10.

Also, since the fin 21 is in contact with the transmitting optical sub-assembly 15 via the silicone sheet 25, the heat generated by the transmitting optical sub-assembly 15 is transferred to the fin 21 via the silicone sheet 25. As a consequence, the heat generated by the transmitting optical sub-assembly 15 can be transmitted to the outside of the optical module 10 more efficiently.

Also, since the fin 21 is in contact with the cage 42 of the host board 40, the frame ground potential of the lower housing 11, upper housing 13, and cover 14 can be stablized, whereby the optical module 10 improves its noise characteristics.

Second Embodiment

Figure 11:
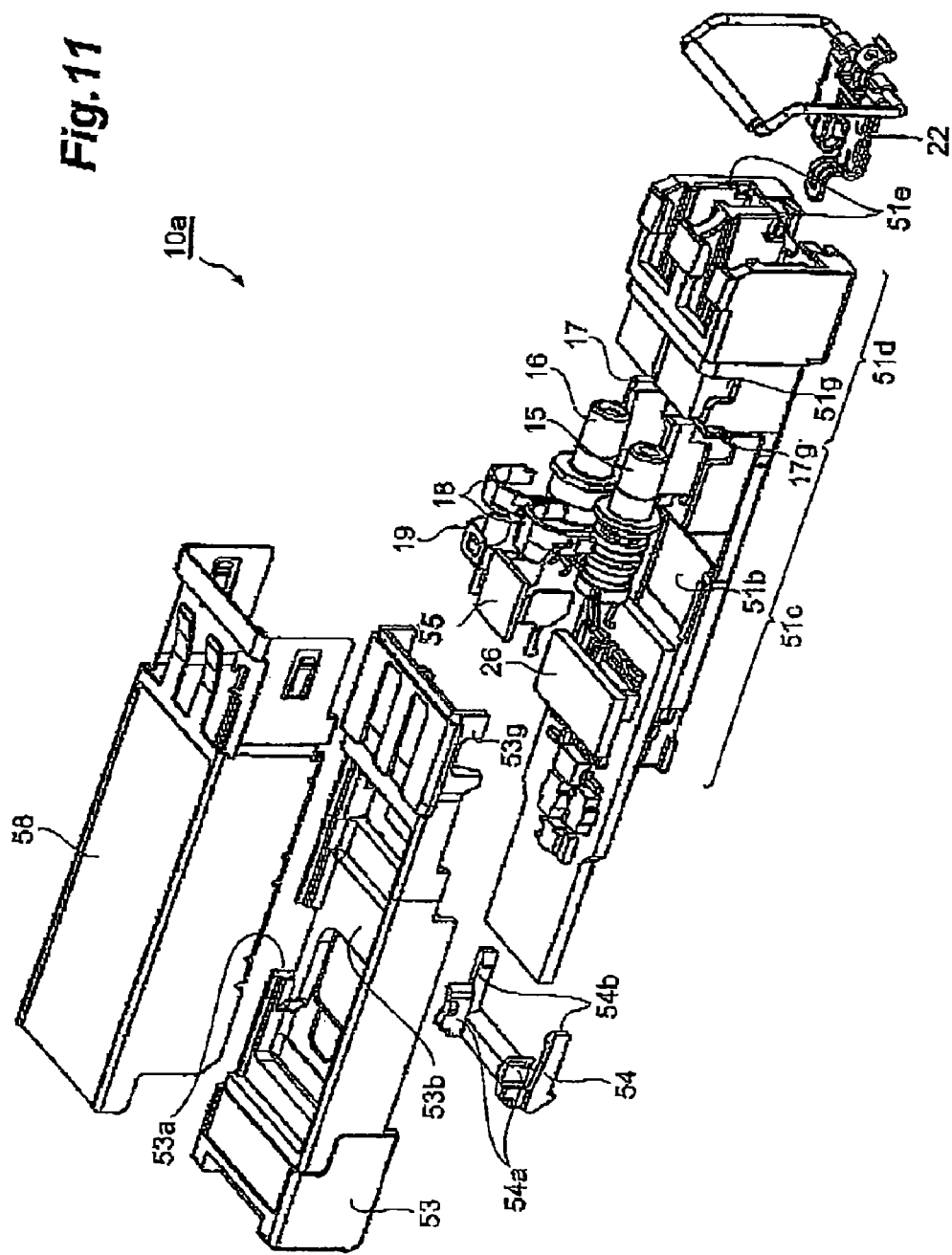
FIG. 11 is an exploded perspective view of the optical module in accordance with a second embodiment of the present invention.

The optical module 10a in accordance with a second embodiment of the present invention will now be explained. FIG. 11 is an exploded perspective view of the optical module 10a in accordance with the second embodiment of the present invention. As shown in FIG. 11, the optical module 10a includes a lower housing 51, a circuit board 12, an upper housing 53, a cover 58, a transmitting optical sub-assembly 15, a receiving optical sub-assembly 16, a block 57, holders 18, brackets 19, an actuator 22, and a substrate stopper 54.

The circuit board 12, transmitting optical sub-assembly 15, receiving optical sub-assembly 16, holders 18, brackets 19, shield 20, and actuator 22 are configured as with those in the optical module 10 in accordance with the first embodiment. The second embodiment differs from the first embodiment in that the optical module 10a lacks the fin 21 and in the form of the substrate stopper 54.

The first substrate 12a is secured to the lower housing 51 by way of the substrate stopper 54. Specifically, the substrate stopper 54 comprises an upper clasp 54a and a lower clasp 54b. The upper clasp 54a holds a pair of edges of the first substrate 12a. The lower clasp 54b holds both sides of a main portion 51c of the lower housing 51.

Figure 12:
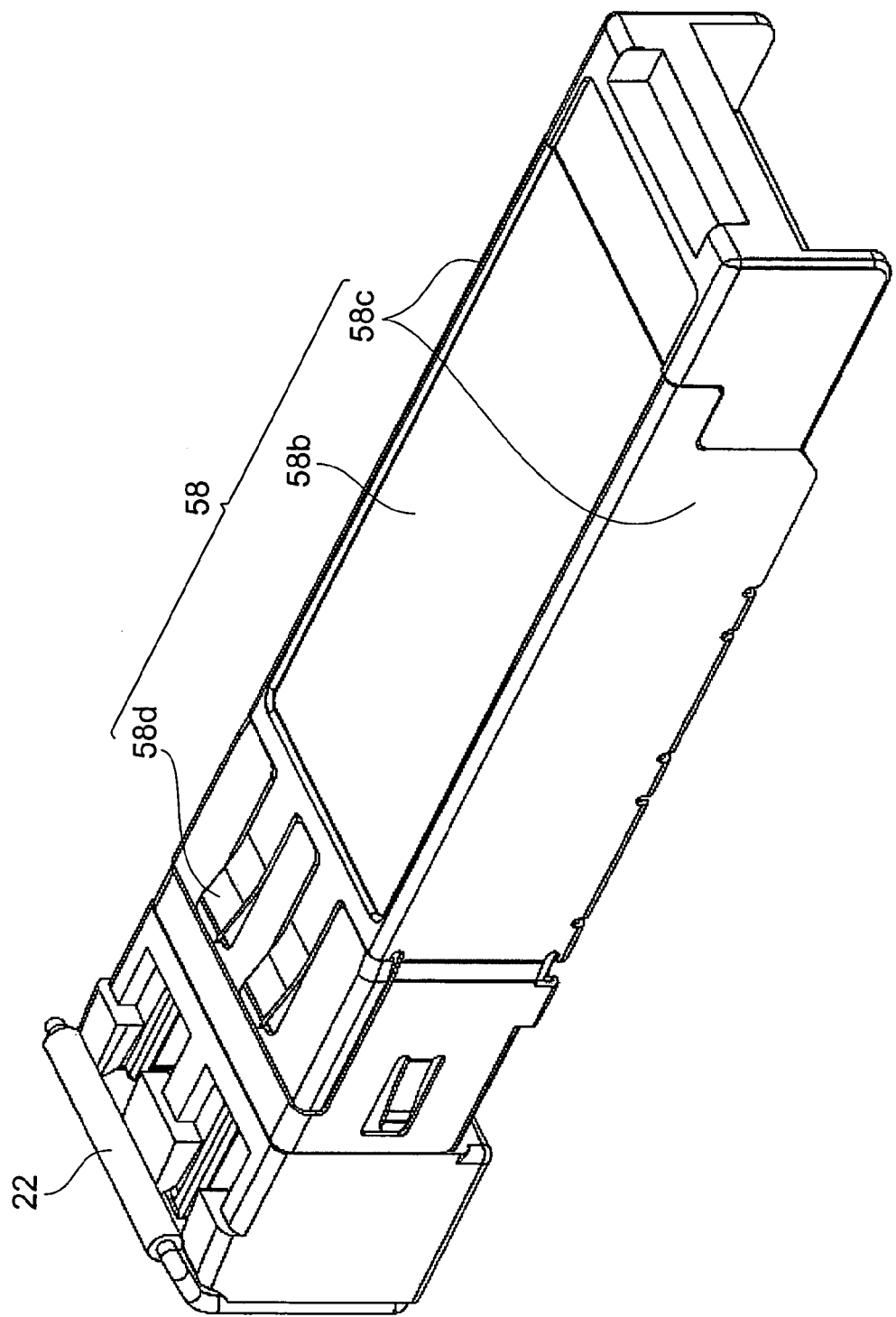
FIG. 12 is a perspective view of the optical module in accordance with the second embodiment of the present invention.

FIG. 12 is a perspective view of the completed optical module 10a. As shown in FIG. 12, in the second embodiment, the cover 58 covers the second substrate 12b, whereby the second substrate 12b is held between the cover 58 and the upper housing 53. Also, the cover 58 and the lower housing 51 hold the upper housing 53 therebetween. Spe- cifically, the cover 58 comprises an upper face 58b and a pair of side faces 58c. The upper face 58b covers the second substrate 12b, whereby the second substrate 12b is held between the upper face 58b and the upper housing 53. The upper housing 53 is held between the side faces 58c and the lower housing 51.

The cover 58 is configured so as to cover only a portion of the upper housing 53, whereby the remaining portion of the upper housing 53 is exposed. As a consequence, the exposed portion of the upper housing 53 constitutes a portion of the outer case of the optical module 10a.

One end of the upper face 58b of the cover 58 is provided with lugs 58d extending toward a cage 42 so as to reliably come into contact with the cage 42 when the optical module 10a is inserted into the cage 42.

Figure 13:
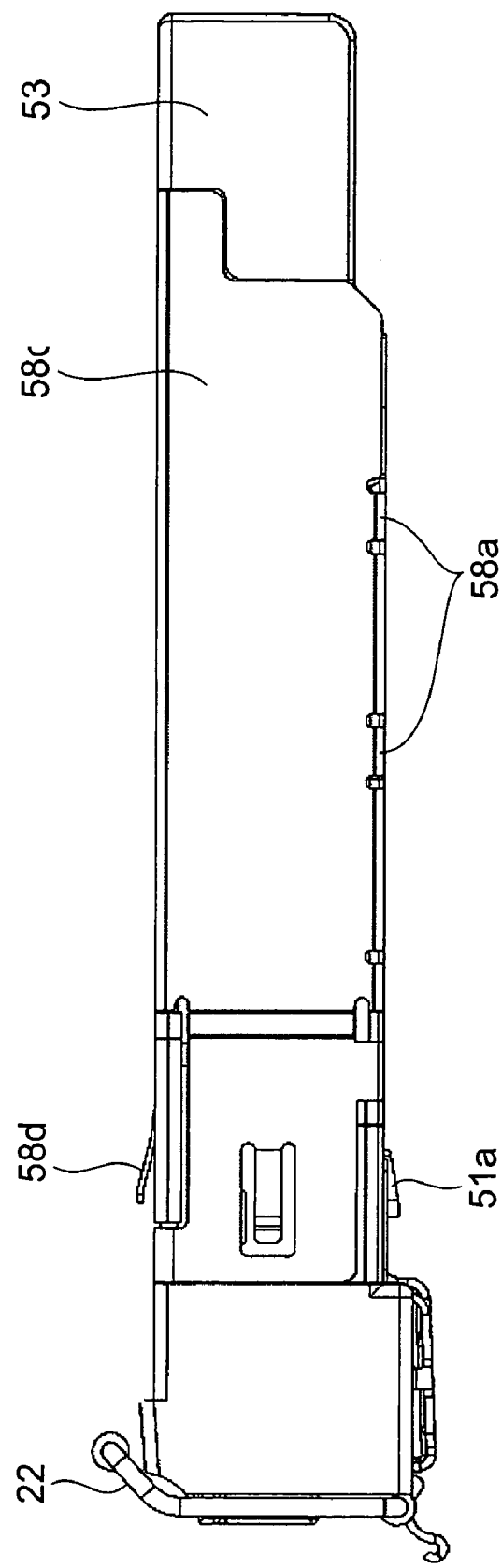
FIG. 13 is a side view of the optical module in accordance with the second embodiment of the present invention.

As shown in FIG. 13, the lugs 58d are disposed at respective positions corresponding to protrusions 51a of the lower housing 51. When the optical module 10a is fitted into the cage 42 provided on the host board 40 shown in FIG. 1, the lugs 58a come into contact with the inside of the cage 42, thereby urging the protrusions 51a of the lower housing 51 toward the host board 40.

In the optical module 10a, the heat generated by the transmitting optical sub-assembly 15 is transferred to the upper housing 53 via a thermal sheet 55. Since a portion of the upper housing 53 is not covered with the cover 58, the heat can directly radiate therefrom to the outside ambience. The upper housing 53 is also in contact with the cover 58, whereby the lugs 58d of the cover 58 come into contact with the cage 42. As a consequence, the heat generated by the transmitting optical sub-assembly 15 can efficiently be transmitted to the outside of the optical module 10a. Namely, the upper housing 53, silicone sheet 55, and cover 58 constitute the "second heat-dissipating path" of the present invention.

When the lugs 58d come into contact with the cage 42, the protrusions 51a of the lower housing 51 are urged toward the host board 40, whereby the optical module 10a is reliably attached to the host board 40.

What is claimed is:

1. An optical module comprising:
   an optical sub-assembly including an opto-electronic device;
   a first circuit board electrically connected to the optical sub-assembly;
   an electronic device mounted on the first circuit board;
   a lower housing for mounting the first circuit board;
   an upper housing disposed so as to cover the first circuit board and electronic device;
   thermal sheets disposed between the electronic device and the upper housing, and between the optical sub-assembly and the upper housing; and
   a metal cover for covering the upper housing;
   wherein the thermal sheet disposed between the electronic device and the upper housing forms a first heat-dissipating path for dissipating heat from the electronic device to the cover via the upper housing; and
   wherein the thermal sheet disposed between the optical sub-assembly and the upper housing forms a second heat-dissipating path, different from the first heat-dissipating path, for dissipating heat from the optical sub-assembly to the cover byway of the upper housing.

2. An optical module according to claim 1,
   wherein the cover includes an elastic portion toward outside of the optical module; and
   wherein, when the optical module is inserted into a cage provided on a host board, the elastic portion and an inner face of the cage come into contact with each other so as to secure a heat-dissipating path for the cage.

3. An optical module according to claim 1,
wherein the first circuit board is held between the upper and lower housings;
the lower housing being provided with a mount for mounting the first circuit board;
a first electronic device being mounted on a main surface of the first circuit board;
a rear face of the first circuit board opposite from the main surface being mounted with a second electronic device;
the upper housing being provided with a first space for mounting the first electronic device; and
the lower housing being provided with a second space for mounting the second electronic device.

4. An optical module according to claim 3, further comprising:
a second circuit board;
a connecting substrate for connecting the first and second circuit boards to each other;
a third electronic device being mounted on a main surface of the second circuit board;
the upper housing being provided with a third space opposing the first space; and
the second circuit board being mounted with the upper housing such that the third electronic device is mounted in the third space.

5. An optical module according to claim 4,
wherein heat from the second electronic device mounted on the rear face of the first circuit board is emitted toward the lower housing; and
wherein heat from the third electronic device mounted on the main surface of the second circuit board is emitted toward the upper housing.

6. An optical module according to claim 1,
wherein the optical sub-assembly is a transmitting optical sub-assembly including a semiconductor light-emitting device as the opto-electronic device; and
wherein the electronic device is a driver IC for driving the transmitting optical sub-assembly.

7. An optical module according to claim 6, further comprising a receiving optical sub-assembly including a semiconductor light-receiving device.

8. An optical module according to claim 1,
wherein the upper housing is made of aluminum die cast or aluminum.

9. An optical module according to claim 1,
wherein the lower housing is made of aluminum die cast or aluminum.

10. An optical module comprising:
an optical sub-assembly including an opto-electronic device;
a circuit board electrically connected to the optical sub-assembly;
an electronic device mounted on the circuit board;
a lower housing for mounting the circuit board;
an upper housing for covering the circuit board and electronic device;
a thermal sheet provided with a fin, the thermal sheet being disposed between the optical sub-assembly and the fin; and
a metal cover for covering the upper housing;
wherein a first heat-dissipating path is formed for dissipating heat from the electronic device to the cover via the upper housing; and
wherein a second heat-dissipating path is formed, independent of the first heat-dissipating path, for dissipating heat from the optical sub-assembly to the outside of the optical module via the fin.

11. An optical module according to claim 10,
wherein the fin has a leading end provided with a projection raised toward the outside of the optical module; and
wherein, when the optical module is inserted into a cage provided on a host board, the projection of the fin and an inner face of the cage come into contact with each other so as to secure the second heat-dissipating path for the cage.

* * * * *